(12) United States Patent
Kim

(10) Patent No.: US 7,116,654 B2
(45) Date of Patent: Oct. 3, 2006

(54) MOBILE INTERNET PROTOCOL SYSTEM AND ROUTE OPTIMIZATION METHOD THEREFOR

(75) Inventor: Kil-Lyeon Kim, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 10/192,613

(22) Filed: Jul. 11, 2002

(65) Prior Publication Data

US 2003/0035387 A1  Feb. 20, 2003

(30) Foreign Application Priority Data

Aug. 16, 2001  (KR) ............... 2001-49265

(51) Int. Cl.
*H04Q 7/24* (2006.01)
(52) U.S. Cl. ............... 370/338; 401/392; 455/445
(58) Field of Classification Search ............... None
See application file for complete search history.

(56) References Cited

U.S. PATENT DOCUMENTS 6,751,459 B1 * 6/2004 Lee et al. ............... 455/445
6,788,660 B1 * 9/2004 Agrawal et al. ............ 370/331
6,804,720 B1 * 10/2004 Vilander et al. ............ 709/229
7,031,275 B1 * 4/2006 Borella et al. ............. 370/328
2001/0028647 A1 * 10/2001 Teraoka ..................... 370/389
2002/0188757 A1 * 12/2002 Yoon et al. ................. 709/245
2003/0021275 A1 * 1/2003 Shabeer ..................... 370/393

* cited by examiner

Primary Examiner—Duc Ho
(74) Attorney, Agent, or Firm—Robert E. Bushnell, Esq.

(57) ABSTRACT

There is provided a route optimization method in a mobile Internet Protocol (IP) system using a mobile Internet Protocol. When a mobile host (MH) moves over the Internet and is assigned to a care-of-address (CoA) corresponding to a changed point of attachment to the Internet, it sends a registration request message containing the care-of address to a home agent (HA) via a foreign agent (FA). The home agent stores the care-of address in relation to a domain name of the mobile host in an internal domain name server database. Upon receipt of a query about the mobile host by domain name from a correspondent node (CN), the home agent sends the care-of address corresponding to the domain name of the mobile host together with caching prevention information to the correspondent node. The caching prevention information is set to prevent the correspondent node or another domain name server from caching the care-of address of the mobile host. The correspondent node communicates with the mobile host using the care-of address.

19 Claims, 7 Drawing Sheets

;:/usr/local/dns/net.zone
..@   IN   SOA   ns.net.pusan.ac.kr. root..ns.net.pusan.ac.kr(
              940414 ;Serial
              21600 ;Refresh(6h)
              900   ;Retry(15min)
              302400 ;Expire(7d)
              43200) ;default ttl(12h)
;domain information
              IN   NS      ns.net.pusan.ac.kr
              IN   NS      ns.pusan.ac.kr
$ORIGIN ce.pusan.ac.kr
ns            IN   A       164.125.71.34
localhost     IN   A       127.0.0.1
mh1   0   IN   A     164.125.9.12
 42      44    46    48          50 o [DOMAIN NAME] [TTL] [CLASS] [RECODE TYPE] [RECODE SPECIFIC DATA] ← 40
      42          44    46      48             50

MOBILE INTERNET PROTOCOL SYSTEM AND ROUTE OPTIMIZATION METHOD THEREFOR

CLAIM OF PRIORITY

This application makes reference to, incorporates the same herein, and claims all benefits accruing under 35 U.S.C. §119 from my application MOBILE INTERNET PROTOCOL SYSTEM AND IT'S ROUTING OPTIMIZATION METHOD filed with the Korean Industrial Property Office on 16 Aug. 2001 and there duly assigned Ser. No. 2001-49265.

BACKGROUND OF THE INVENTION

1. Technical Field

The present invention relates generally to a communication system, and in particular, to a mobile Internet Protocol (IP) system and a route optimization method therefore.

2. Related Art

The Internet today is a popular medium for many different types of multimedia information services. The Internet is a large set of interconnected computer networks, including commercial networks (.com), military networks (.mil), education-related networks (.edu), and other networks (.org and .net, for example). Typically, a person will access the information and services available on the Internet by using a World-Wide Web browser.

The growing demands for multimedia service have spurred widespread deployment of asynchronous transfer mode-based high-speed networks for wide area network (WAN) and local area network (LAN) as used in schools and research institutes. Nevertheless, Internet service is still the most popular.

Accordingly, methods of implementing Internet Protocol (IP) in high-speed communication networks such as asynchronous transfer mode have been proposed mainly by Internet Engineering Task Force (IETF) and the asynchronous transfer mode forum. Such methods are currently under standardization. Internet Protocol is a packet switching protocol.

Due to the rapid development of mobile communication technology, it is expected that the future networks will become wired and wireless networks in interaction with each other or in an integrated form. Such an integrated wired/wireless network must be able to support mobility to implement Internet Protocol service. Internet Engineering Task Force has devised mobile Internet Protocol to support mobility over the Internet, and European Telecommunications Standardization Institute Broadband Access Network (ETSI BRAN) are working on wireless asynchronous transfer mode (ATM) in close cooperation with the asynchronous transfer mode forum to support mobility in asynchronous transfer mode networks. However, no research has been conducted on techniques of providing Internet service over an asynchronous transfer mode-based integrated wired/wireless network.

Wireless Asynchronous Transfer Mode Working Group (WATM WG) is developing standards of Wireless asynchronous transfer mode that is an extension of existing asynchronous transfer mode technology for the wired field to the wireless field, whereas Internet Engineering Task Force is working on the standardization of mobile Internet Protocol, aiming at efficient implementation of mobile wireless networks and expansion of mobility to the wireless area by integrating routing protocols in mobile nodes.

In view of the foregoing, it would be advantageous to develop and utilize an improved, efficient, and advantageous mobile Internet Protocol system and route optimization therefore.

SUMMARY OF THE INVENTION

It is, therefore, an object of the present invention to provide a route optimization method in a mobile Internet Protocol and a mobile Internet Protocol system therefore.

It is another object of the present invention to provide a route optimization method and a mobile Internet Protocol system therefore, which can increase Internet access performance in a radio link-including network.

It is a further object of the present invention to provide a route optimization method and a mobile Internet Protocol system therefore, which can avoid triangle routing where packets from an existing host connected to the Internet are tunneled to a mobile host via a home agent in a radio link-including network.

The foregoing and other objects are achieved by providing a mobile Internet Protocol system using a mobile Internet Protocol and a route optimization method therefore. When a mobile host (MH) moves over the Internet and is assigned to a care-of-address (CoA) corresponding to a changed point of attachment to the Internet, it sends a registration request message containing the care-of address to a home agent (HA) via a foreign agent (FA). The home agent stores the care-of address in relation to a domain name of the mobile host in an internal domain name server database. Upon receipt of a query about the mobile host by domain name from a correspondent node (CN), the home agent sends the care-of address corresponding to the domain name of the mobile host together with caching prevention information to the correspondent node. The caching prevention information is set to prevent the correspondent node or another domain name server from caching the care-of address of the mobile host. The correspondent node communicates with the mobile host using the care-of address.

To achieve these and other objects in accordance with the principles of the present invention, as embodied and broadly described, the present invention provides a route optimization method in a mobile Internet Protocol system using a mobile Internet Protocol, the method comprising: sending a registration request message containing a care-of address to a home agent through a foreign agent when a mobile host is assigned to the care-of address corresponding to a changed point of access to the Internet, the home agent being a part of a home network for the mobile host to access the Internet, the foreign agent being a part of a foreign network for the mobile host to access the Internet, the home agent being distinguishable from the foreign agent; storing the care-of address in an internal domain name server database by the home agent, the care-of address being stored to correspond to domain name of the mobile host; when a query by domain name about the mobile host is received from a correspondent node, sending the care-of address corresponding to the domain name of the mobile host together with caching prevention information to the correspondent node from the home agent, the caching prevention information being set to prevent the correspondent node from caching the care-of address of the mobile host, the caching prevention information being set to prevent any domain name server from caching the care-of address of the mobile host; and communicating with the mobile host by the correspondent node using the care-of address corresponding to the domain name of the mobile host.

To achieve these and other objects in accordance with the principles of the present invention, as embodied and broadly described, the present invention provides a communication optimization method for communicating through the Internet, the method comprising: providing a domain name to a mobile host; storing in a database a care-of address to correspond to the domain name of the mobile host, said storing being performed by a home agent when the care-of address of the mobile host is received, the care-of address corresponding to a new point of attachment when the mobile host attaches to the Internet from the new point of attachment; sending the care-of address corresponding to the domain name of the mobile host together with caching prevention information to a correspondent node by the home agent in response to a query about the mobile host by domain name from the correspondent node, the caching prevention information being set to prevent the correspondent node from caching the care-of address of the mobile host, the caching prevention information being set to prevent any domain name server from caching the care-of address of the mobile host; and communicating with the mobile host by the correspondent node using the care-of address corresponding to the domain name of the mobile host.

To achieve these and other objects in accordance with the principles of the present invention, as embodied and broadly described, the present invention provides a mobile Internet Protocol system, comprising: an Internet; a mobile host having a domain name and establishing a link with the Internet; a home agent in a home network, said mobile host attaching to the Internet through said home agent when said mobile host is in the home network; and a foreign agent in a foreign network, said mobile host attaching to the Internet through said foreign agent when said mobile host is moved from the home network to the foreign network; said home agent storing in a domain name server database a care-of address of said mobile host to correspond to the domain name when said mobile host is attached to the Internet through said foreign agent, said home agent storing the care-of address in response to a registration request message sent to said home agent when said mobile host is moved to the foreign network, the registration request message containing the care-of address; said home agent sending to a correspondent node the care-of address and caching prevention information in response to a query from the correspondent node about said mobile host, the query being by domain name, the caching prevention information being set to prevent the correspondent node from caching the care-of address of the mobile host, the caching prevention information being set to prevent any domain name server from caching the care-of address of said mobile host.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Internet Protocol version 4 (abbreviated to IPv4), which is the current version Internet Protocol, was designed such that a fixed host and a wired network are considered. Solely in IPv4, the point of attachment to the Internet of a host (or a node) can be identified by its Internet Protocol address. If a particular host is to receive its packet, it must be located within the network including its address. When the location of the host is changed, no packet can be delivered to the host. A mobile host (MH) should also be located within a network including its Internet Protocol address for data communication over the Internet. If the mobile host moves to a foreign network, its Internet attachment point is changed and as a result, an established Transmission Control Protocol (TCP) connection cannot be maintained. The mobile host can continue communication even from the foreign network by setting its Internet Protocol address to the Internet Protocol address of the foreign network. Internet Engineering Task Force mobile Internet Protocol is an extension of the IPv4 designed to continue ongoing communication without interruption when the Internet attachment point of a mobile host is changed, that is, to support the mobility of the mobile host over the Internet. In mobile Internet Protocol, mobility is provided to Internet Protocol so that a mobile host having an Internet Protocol address can make packet data communications with its correspondent node(CN) while roaming over the Internet.

Figure 1:
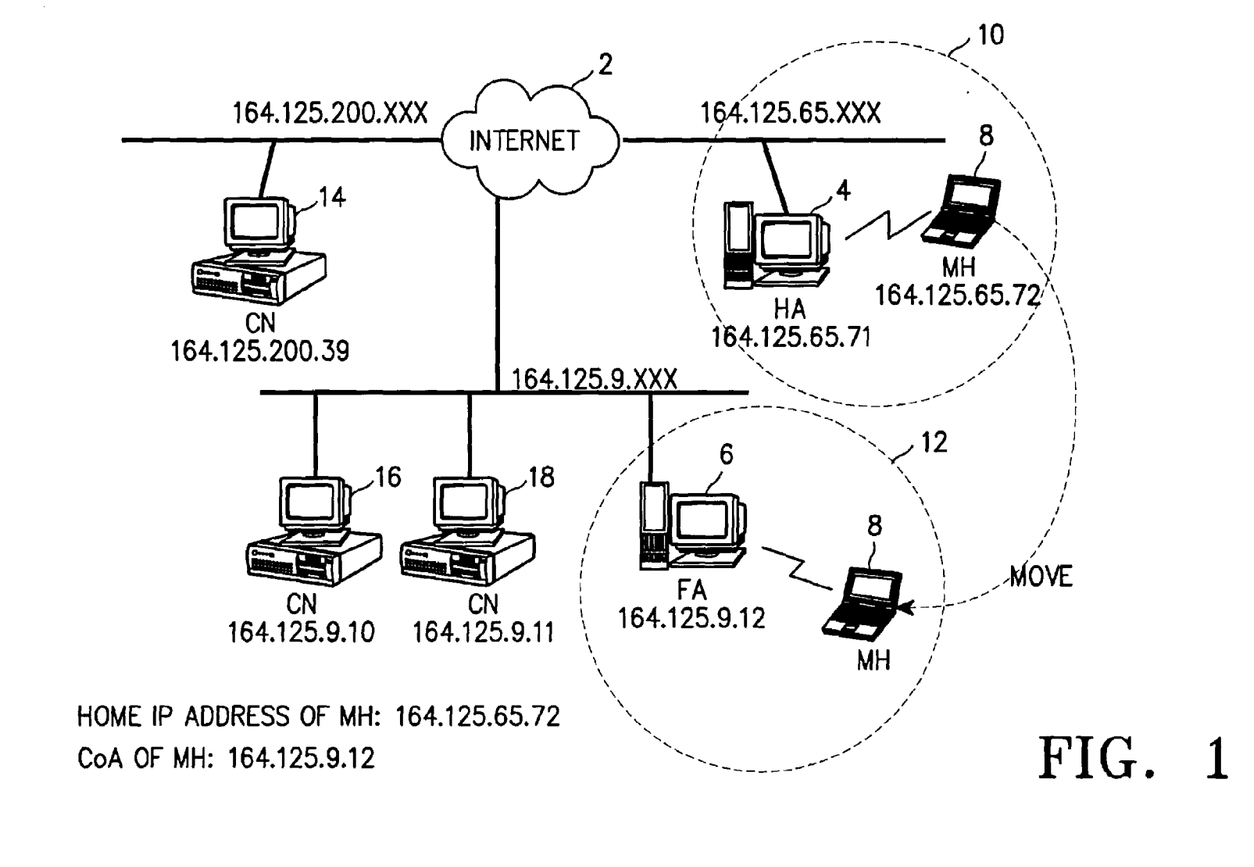
FIG. 1 illustrates a mobile Internet Protocol (IP) network system configuration.
Figure 2:
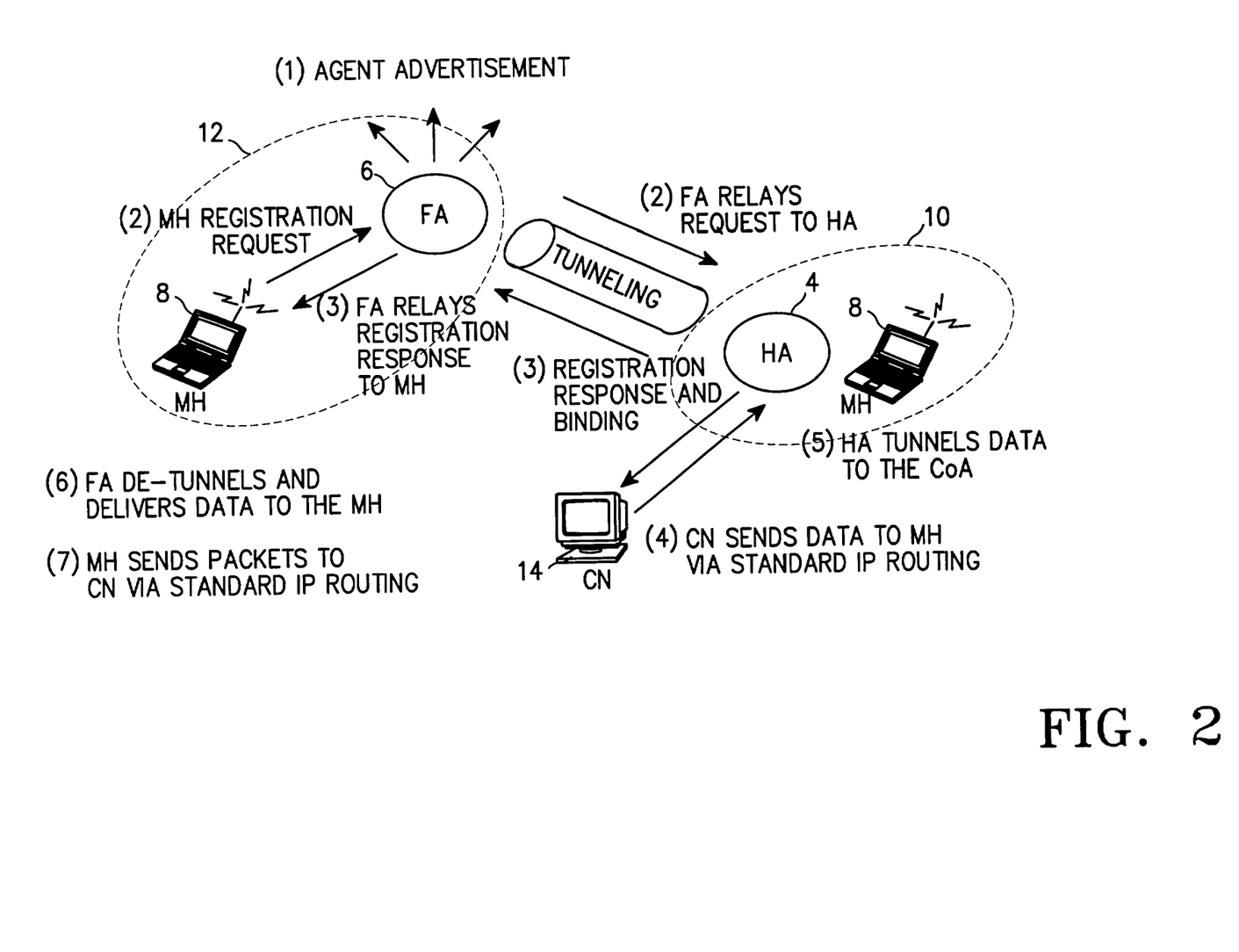
FIG. 2 illustrates a mobile Internet Protocol operation.

The concepts of home agent (HA), foreign agent (FA), care-of address (CoA), and tunneling have been introduced in mobile Internet Protocol to support the mobility of a mobile host. FIG. 1 illustrates a mobile Internet Protocol (IP) network system configuration and FIG. 2 illustrates a mobile Internet Protocol (IP) operation. Referring to FIG. 1, a home agent 4, a foreign agent 6 and correspondent nodes 14, 16 and 18 are connected to the Internet 2 in the mobile Internet Protocol network. A mobile host 8 is located in a home network 10 with an Internet Protocol address 164.125.64.XXX. The Internet Protocol address of the mobile host 8 is 164.125.64.72. If the mobile host 8 moves to a foreign network 12, a care-of address is assigned to the mobile host 8 for packet transmission/reception between the mobile host 8 and a correspondent node in communication with the mobile host 8 among the correspondent nodes 14, 16 and 18 in the mobile Internet Protocol technology. The care-of address is a temporary Internet Protocol address representing the current Internet attachment point of the mobile host 8, assigned by the foreign agent 6 or a dynamic host configuration protocol (DHCP). In FIG. 1, 164.125.9.12 is given as the care-of address (CoA) of the mobile host 8 assigned by the home agent 6.

Mobile Internet Protocol is implemented by agent discovery, registration, routing and tunneling as a whole, which will be described referring to FIG. 2. The foreign agent 6 broadcasts its presence via an agent advertisement message (1). The mobile host 8 obtains network information included in a received agent advertisement message and determines whether mobile host 8 is in the home network 10 or in the foreign network 12. If the mobile host 8 is in the foreign network 12, it sends a registration request message containing its care-of address to the home agent 4 via the foreign agent 6 (2). The home agent 4 sends a registration response message to the mobile host 8 via the foreign agent 6 and registers the care-of address of the mobile host 8 at a binding cache (3). In the binding cache (memory), the home Internet Protocol address, care-of address, and registration lifetime information of mobile hosts are stored.

Upon generation of a packet destined for the mobile host 8, the correspondent node 14 transmits the packet to the home agent 4 of the home network 10 including the home Internet Protocol address of the mobile host 8 via standard Internet Protocol routing (4). The home agent 4 encapsulates the received packet by attaching an Internet Protocol header containing the care-of address of the mobile host 8 to the packet and tunnels the encapsulated packet to the care-of address of the mobile host 8 in the foreign network 12 (5). The foreign agent 6 in the foreign network 12 de-tunnels the received packet and delivers it to the mobile host 8 (6). Then, the mobile host 8 can send packets to the correspondent node 14 by the standard Internet Protocol routing without having to detour through the home agent 4.

As noted from the above-described mobile Internet Protocol implementation, shown in FIGS. 1 and 2, when the mobile host 8 moves out of its home network 10 to the foreign network 12, packets are tunneled to the mobile host 8 via the home agent 4. On the other hand, when the mobile host 8 is to deliver packets to another node over the Internet, it can deliver them directly to the node by the standard Internet Protocol routing. This asymmetry is called "triangle routing". In mobile Internet Protocol the correspondent node 14 has to deliver all its packets to the mobile host 8 via the home agent 4 by triangle routing. Triangle routing requires tunneling of packets from a correspondent node to a foreign agent via a home agent and deteriorates the efficiency of the network. More specifically, triangle routing is undesirable because unnecessary end-to-end packet delay and overhead arise. Moreover, the tunneling imposes great overhead on the home agent 4 and attachment of an Internet Protocol header to the original packet in the tunneling brings about a significant bandwidth waste. According to related research, it is reported that triangle routing overhead reaches 76% at worst and tunneling overhead exceeds 6%. Accordingly, different techniques of increasing Internet access performance in a network containing radio links by eliminating the triangle routing had to be studied.

One such different technique is "Route Optimization in Mobile IP", proposed as an Internet Protocol standard by an IETF mobile Internet Protocol working group and disclosed on Nov. 15, 2000. However, the "Route Optimization in Mobile IP" technology has the drawbacks of incompatibility with the existing host Internet Protocol layer, complicated protocol, great overhead of control messages and processing overhead, and discrepancy between binding caches.

Another different technique of avoiding triangle routing is "Internet Protocol Version 6 (IPv6) Specification" (RFC 1883) adopted on December 1995. IPv6 implements address auto-configuration having the features of dynamic care-of address assignment to a mobile host and use of DHCPv6 (Dynamic Host Configuration Protocol Version 6). Unfortunately, IPv6 cannot assure compatibility with old Internet systems.

Figure 6:
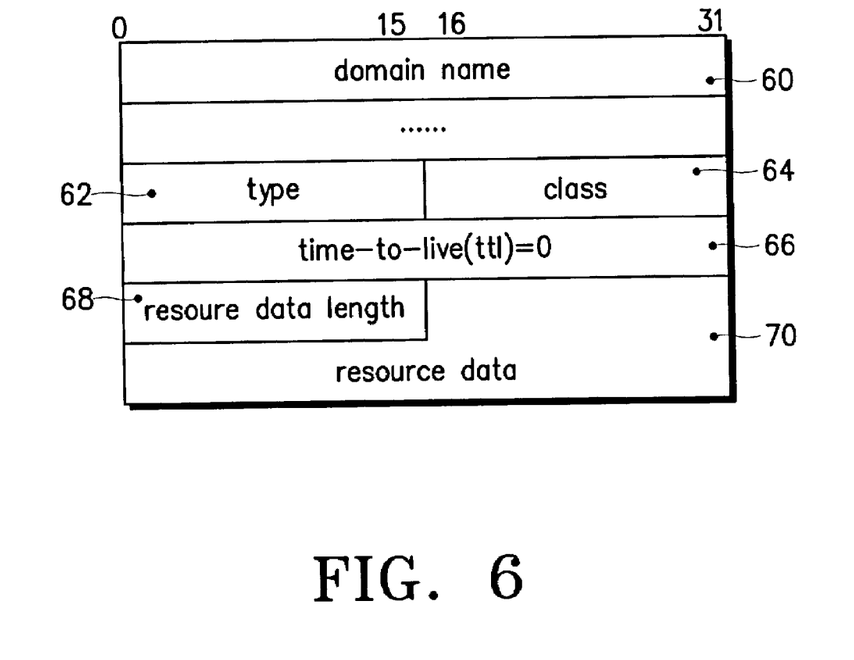
FIG. 6 illustrates the format of a domain name system response message for the domain name system query message, sent from the home agent.
Figure 7:
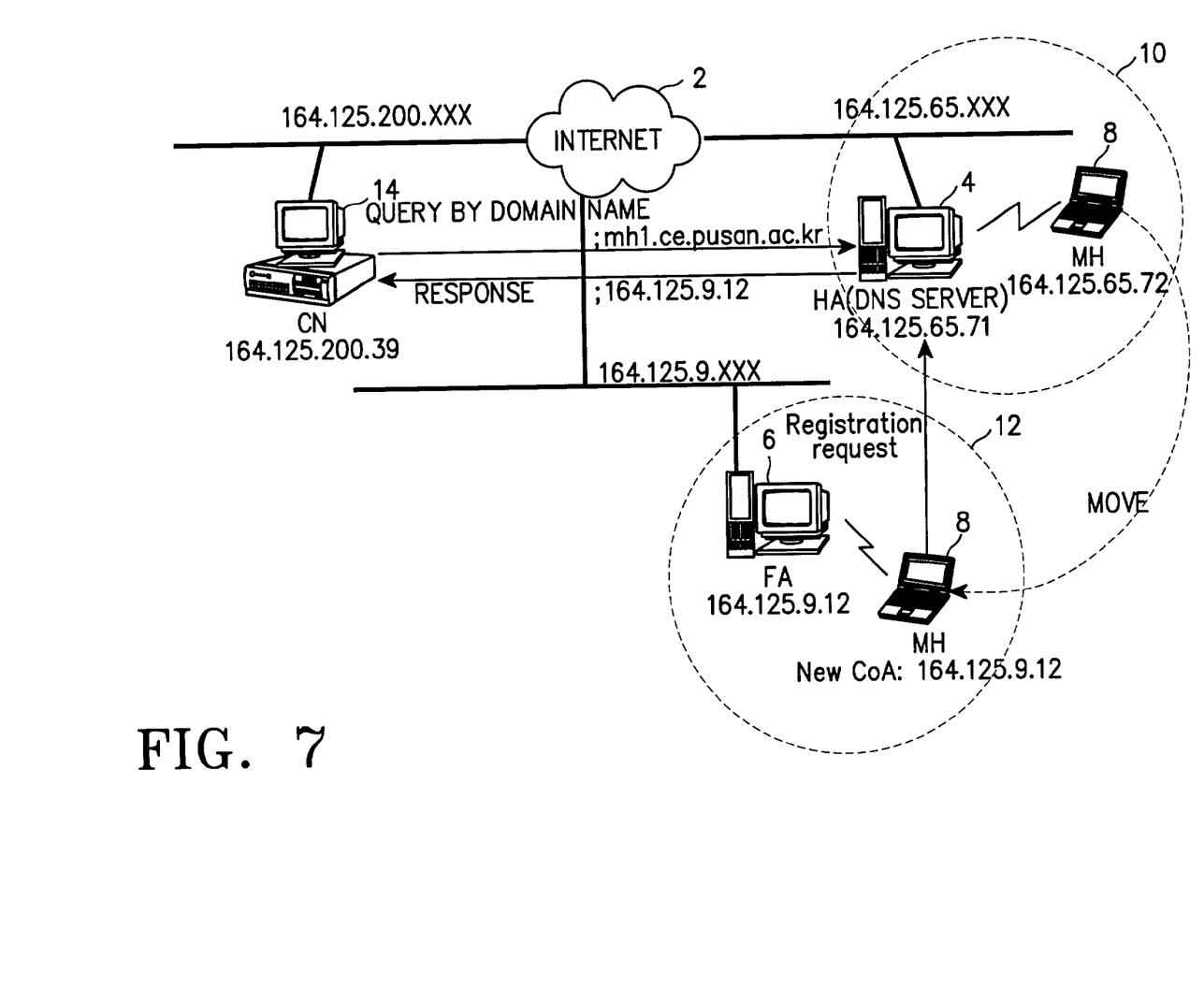
FIG. 7 illustrates a mobile Internet Protocol network system configuration, in accordance with the principles of the present invention.

A preferred embodiment of the present invention will be described hereinbelow with reference to the accompanying FIGS. 3 through 8. FIG. 7 illustrates a mobile Internet Protocol network system configuration, in accordance with the principles of the present invention. Referring to FIG. 7, the mobile host (MH) 8 is a node that establishes a radio link with the Internet 2. The home agent (HA) 4 is at the point of attachment of the mobile host 8 to the Internet 2 in the home network 10, and the foreign agent (FA) 6 is at the point of attachment of the mobile host 8 to the Internet 2 in the foreign network 12. In accordance with the principles of the present invention, mobile hosts including the mobile host 8 have their own respective domain names.

In the embodiment of the present invention, the home agent 4 functions as a domain name system (DNS) server and triangle routing is eliminated by use of the domain name system server function, to thereby improve mobile Internet Protocol performance.

The embodiment of the present invention is realized based on the idea that although the mobile host 8 has a different Internet Protocol address depending on its point of attachment to the Internet 2, its domain name is unchanged and a care-of address (CoA) assigned to the mobile host 8 to identify its current attachment point is transparent to the application layers of other hosts but is known to the home agent 4. Therefore, each host has its own domain name and the home agent 4 functions as the domain name system server having authority over the domain name of the mobile host 8.

Figure 3:
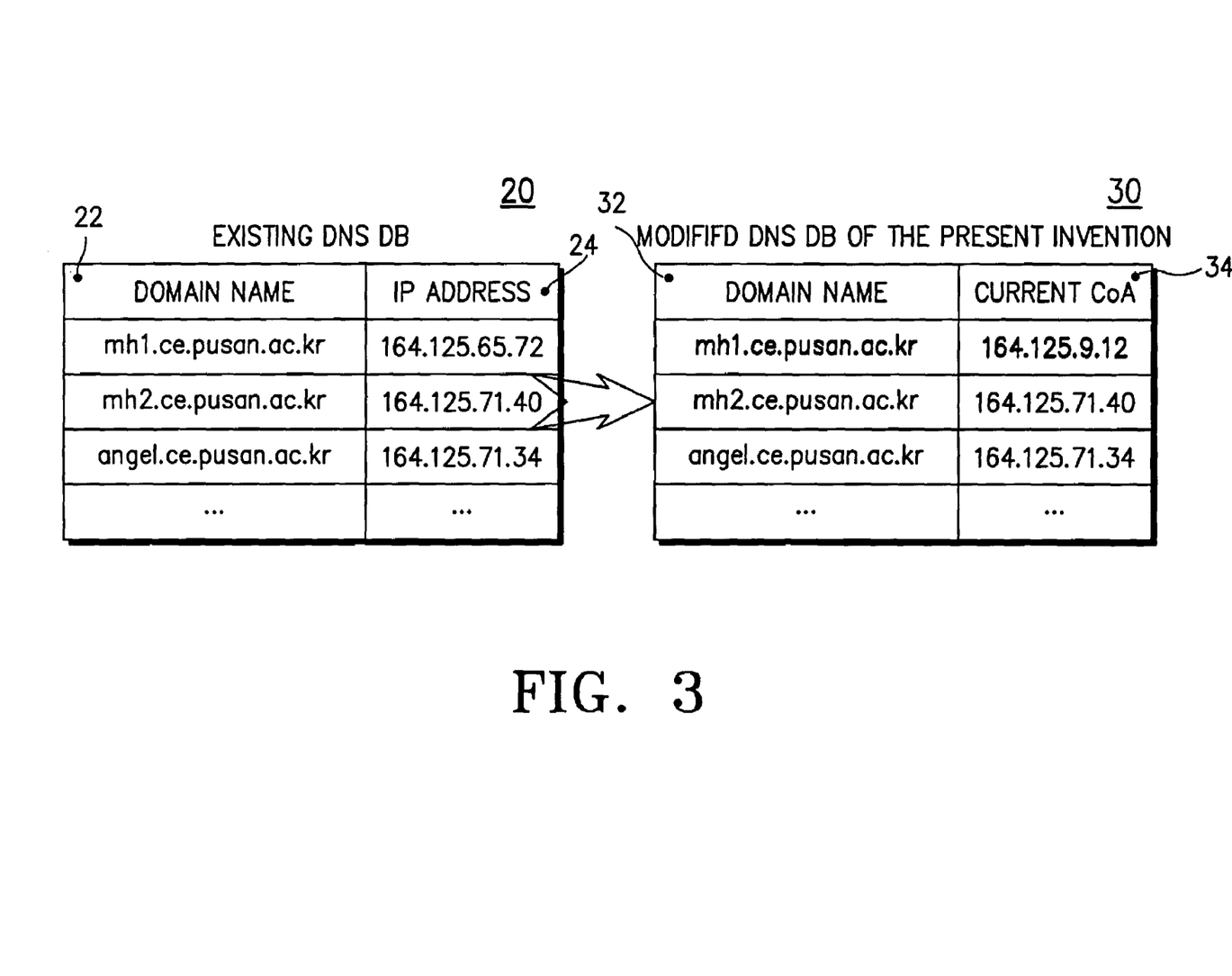
FIG. 3 illustrates a modified domain name system (DNS) database for a home agent, in accordance with the principles of the present invention.

FIG. 3 illustrates a modified domain name system (DNS) database for a home agent, in accordance with the principles of the present invention. FIG. 3 illustrates a domain name system server database for the home agent 4 shown in FIG.

7 according to the embodiment of the present invention. A typical domain name system server translates domain names into numerical Internet Protocol addresses. As shown in FIG. 3, a typical domain name system server database 20 includes domain names 22 and their corresponding home Internet Protocol addresses 24 in resource record areas. For example, the domain name "mh1.ce.pusan.ac.kr" of the mobile host 8 shown in FIG. 1 is recorded with its home Internet Protocol address "164.125.65.72" in a resource record area. Meanwhile, a modified domain name system database 30 for the home agent 4 according to the embodiment of the present invention has domain names 32 in relation to current care-of addresss. For example, the domain name "mh1.ce.pusan.ac.kr" of the mobile host 8 is recorded with its current care-of address "164.125.9.12" in the modified domain name system database 30. The current care-of address of the mobile host 8, "164.125.9.12" indicates where the mobile host 8 is located within the foreign network 12.

Figure 4:
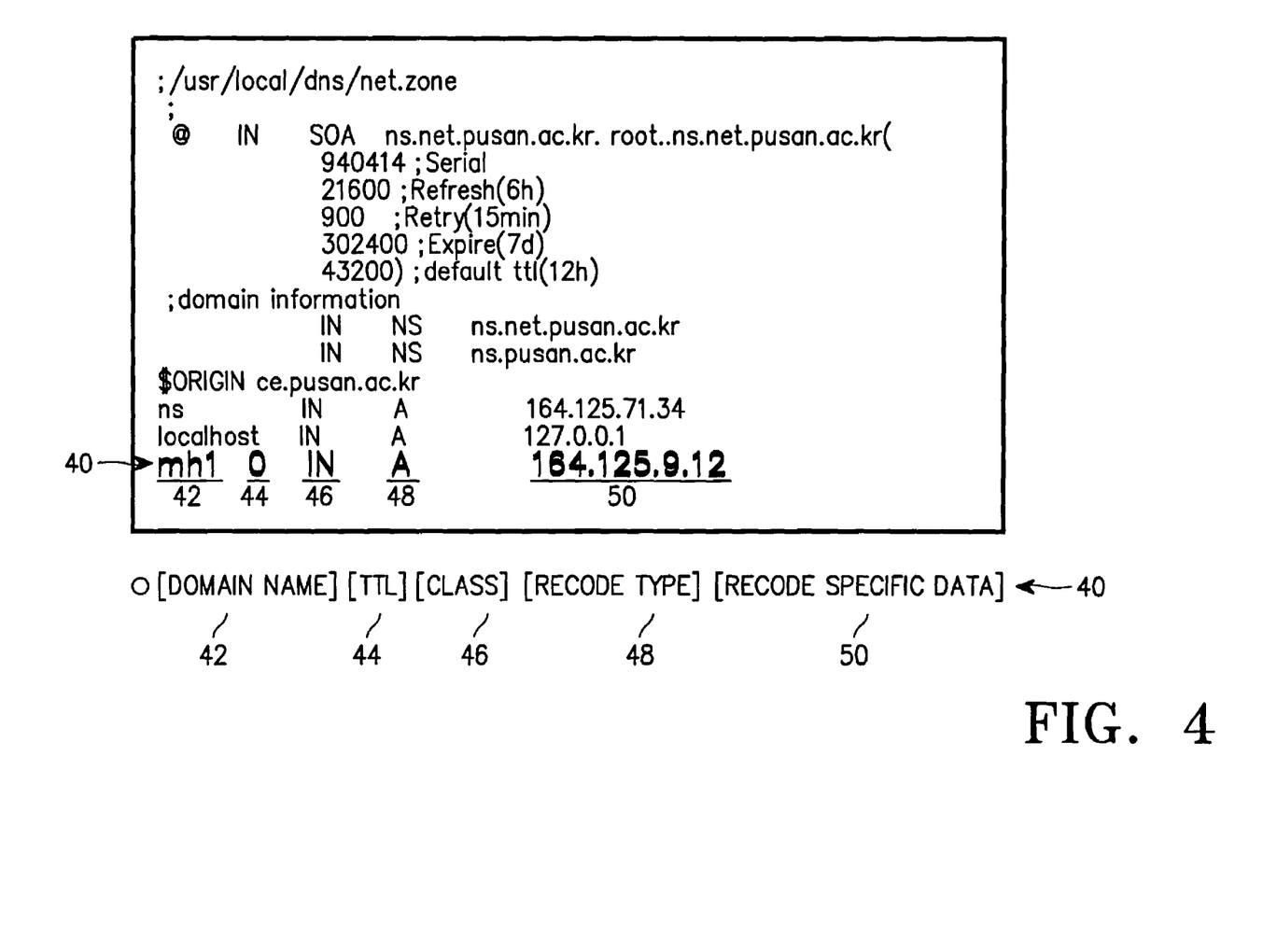
FIG. 4 illustrates a domain name system server zone file stored in a resource record format in the domain name system database of the home agent, in accordance with the principles of the present invention.

A domain name system (DNS) server zone file containing the domain name and current care-of address of the mobile host 8 is stored in a standard resource record format in the modified domain name system server database 30 as shown in FIG. 4. Referring to FIG. 4, reference numeral 40 denotes a resource record area. Domain name 42, TTL (time-to-live) 44, class 46, record type 48, and record specific data 50 are recorded in the resource record area 40. According to the embodiment of the present invention, the record specific data 50 includes the care-of address of the mobile host 8. The TTL 44 is the caching period of a domain name resource record. The TTL 44 is set to 0 to prevent the correspondent node 14 or a local domain name system server related with the correspondent node 14 from caching the resource record of the mobile host 8 in the embodiment of the present invention.

With reference to FIG. 7, as the mobile host 8 moves out of the home network 10 into the foreign network 12, it is assigned to a new care-of address (CoA) by the foreign agent 6. The mobile host 8 then sends a registration request message containing the new care-of address to the home agent 4 via the foreign agent 6 and the home agent 4 updates the care-of address of the home agent 8 in the record specific data 50 of the resource record area 40 to the new care-of address. To describe in more detail, the home agent 4 records "mh1 0 IN A 164.125.9.12" in the resource record area 40 as shown in FIG. 4. That is, "mh1.ce.pusan.ac.kr" is recorded as the domain name 42, 0 is set in the TTL 44, "IN" indicative of Internet address is recorded as the class 46, "A" indicative of query for Internet Protocol address is recorded as the record type 48, and the current care-of address of the mobile host, "164.125.9.12" is recorded in the record specific data 50. The TTL 44 is set to 0 by the home agent 4 according to the embodiment of the present invention, so that the local domain name system server of the correspondent node 14 cannot cache the resource record area 40 due to TTL=0 and thus the care-of address "164.125.9.12" of the mobile host 8 in the domain name system (DNS) server database 30 is delivered from the home agent 4 to the correspondent node 14. As described above, as the home agent 4 updates the CoA-containing information of the mobile host 8 in the modified domain name system server database 30, the domain name of the mobile host 8 is mapped in correspondence with its current care-of address (CoA).

The care-of address (CoA) updating is carried out contemporaneously with binding cache updating that is the process of updating the care-of address (CoA) of the mobile host 8 in relation to its home Internet Protocol address at a binding cache of the home agent 4. Consequently, when a user of the correspondent node 14 queries about the mobile host 8 by domain name, a communication is conducted between the correspondent node 14 and the mobile host 8 by route optimization with no triangle routing required. If the user of the correspondent node 14 queries about the mobile host by home Internet Protocol address, the correspondent node 14 comes in communication with the mobile host 8 by triangle routing.

In accordance with the principles of the present invention, in the case where the correspondent node 14 issues a query about the mobile host 8 by domain name, the home agent 4 searches the modified domain name system database 30 for the current care-of address of the mobile host 8 corresponding to the domain name. Thereafter, the correspondent node 14 can deliver packets directly to the current care-of address of the mobile host 8, thereby eliminating triangle routing.

In the present domain name system, however, a local domain name system server or a domain name system server in any other layer records in their caches the Internet Protocol address of a mobile host about which a correspondent node queries by domain name. Therefore, if the correspondent node queries about the mobile host by domain name again later, the correspondent node 14 itself retrieves the cached Internet Protocol address, or the local domain name system server or the domain name system server in any other layer retrieves the cached Internet Protocol address and sends it directly to the correspondent node 14. In this case, the current care-of address of the mobile host 8 updated in the domain name system server database of the home agent cannot be known to the correspondent node 14.

A TTL field contained in a domain name system response message sent from the home agent 4 to the correspondent node 14 for a correspondent node's query received at the home agent 4 is used to overcome the above problem regarding the caches. The value of the TTL field indicates the caching period of a domain name resource record and is recorded in seconds. The TTL value is usually set to 48 hours. In the embodiment of the present invention, upon receiving a query about the mobile host 8 by domain name from the correspondent node 14, the home agent 4 reads "0" from the TTL 44 in the resource record area 40 shown in FIG. 4, sets "TTL=0" in a TTL field 66 of the domain name system response message, while recording corresponding information in the other fields, and sends the domain name system response message to the correspondent node 14. As seen from the format of the domain name system response message shown in FIG. 6, the home agent sets the TTL 66 to 0 to prohibit the correspondent node 14 or its related local domain name system server from recording the domain name resource record of the mobile host in its cache.

Figure 5:
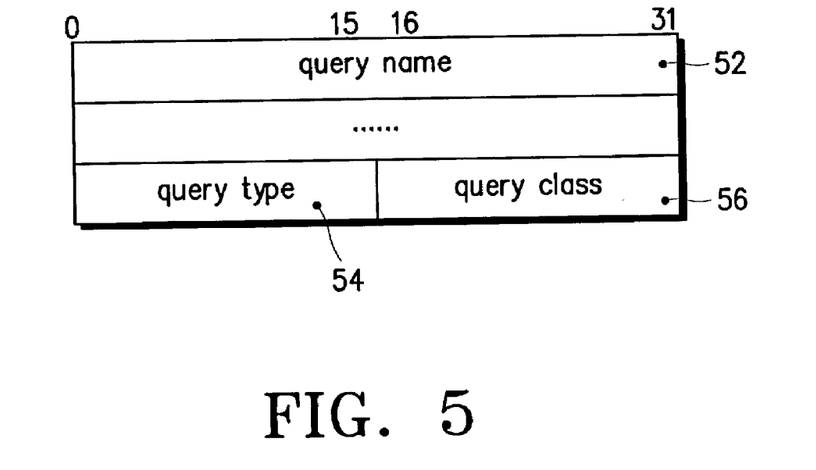
FIG. 5 illustrates part of the format of a domain name system query message sent from a correspondent node to the home agent.

FIG. 5 illustrates part of the format of a domain name system query message sent from a correspondent node to the home agent. FIG. 5 partially illustrates the format of a domain name system query message sent from the correspondent node 14 to the home agent 4 and FIG. 6 illustrates the format of a domain name system response message that the home agent 4 sends to the correspondent node 14 for the domain name system query message.

FIG. 4 illustrates a domain name system server zone file stored in a resource record format in the domain name system database of the home agent, in accordance with the principles of the present invention. FIG. 6 illustrates the format of a domain name system response message for the domain name system query message, sent from the home agent.

With reference to FIG. 7, if the correspondent node 14 issues a query about the mobile host 8 by domain name by filling a domain name "mh1.ce.pusan.ac.kr" in a query name filed 52, information representing a query for an Internet Protocol address in a query type field 54, and information representing a query for an Internet address in a query class field 56 in the format shown in FIG. 5, it sends the query to its local domain name system server. Then, the home agent 4 reads the information of the resource record area 40 of the mobile host 8 in correspondence with the domain name "mh1.ce.pusan.ac.kr" from the modified domain name system database 30 shown in FIG. 4. The home agent 4 generates a domain name system response message shown in FIG. 6 by recording "mh1.ce.pusan.ac.kr" in a domain name field 60, information indicating an Internet Protocol address in a type field 62, information indicating a query for an Internet address in correspondence to the domain name in a class field 64, TTL=0 in a TTL field 66, resource data length information in a resource data length field 70, and the care-of address of the mobile host 8 "164.125.9.12" corresponding to "mh1.ce.pusan.ac.kr" in a resource data field 70. The home agent 4 sends the domain name system response message to the correspondent node over the Internet 2.

To sum up, upon receipt of a query about the mobile host (MH) 8 by domain name from the correspondent node (CN) 14, the home agent (HA) 4 sends a domain name system (DNS) response message containing the time-to-live (TTL) field 66 set to 0 and the resource data length field 70 set to the care-of address (CoA) of the mobile host 8 to the correspondent node 14. Due to TTL=0, either the correspondent node 14 or its local domain name system server does not record the domain name resource record of the mobile host 8 at its cache. Thus, when the correspondent node 14 generates a query again about the mobile host 8 by domain name, the query message is delivered to the home agent 4 with which the domain name of the mobile host 8 is registered. The home agent 4 reads the care-of address (CoA) 34 of the mobile host 8 in correspondence to its domain name from the modified domain name system server database 30 and sends the care-of address 34 to the correspondent node 14. Thus, the correspondent node 14 is brought into communication with the mobile host 8 at the care-of address 34.

Figure 8:
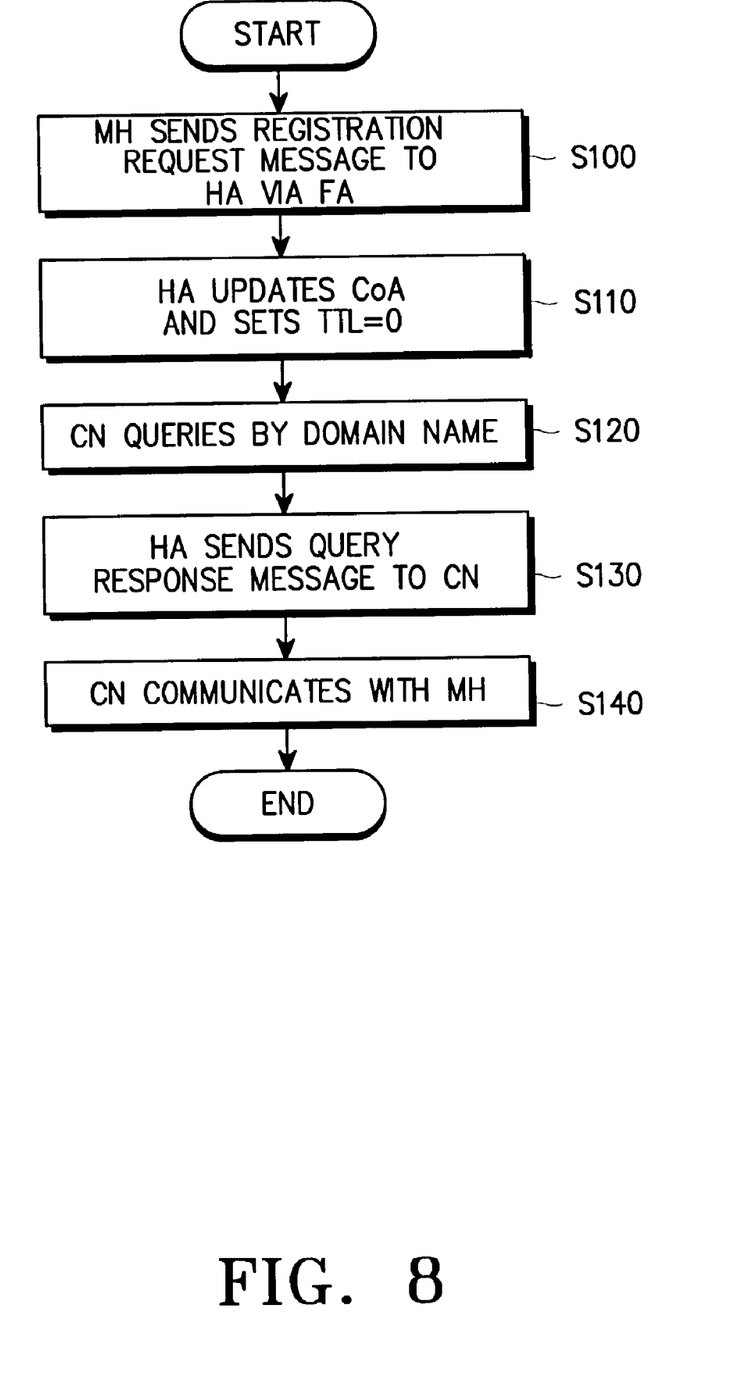
FIG. 8 is a flowchart illustrating a route optimization method in which triangle routing is avoided, in accordance with the principles of the present invention.

FIG. 8 is a flowchart illustrating a route optimization method in which triangle routing is avoided, in accordance with the principles of the present invention. FIG. 8 is a flowchart illustrating a route optimization method which eliminates triangle routing. Referring to FIGS. 7 and 8, the route optimization according to the embodiment of the present invention is implemented as follows.

At step S100, every time its care-of address is changed, the mobile host 8 notifies the home agent 4 of its current care-of address via the foreign agent 6 by a registration request message.

At step S110, the home agent 4 updates the Internet Protocol address recorded in the domain name resource record of the mobile host 8 in the domain name system server database 30 shown in FIGS. 3 and 4 with the current care-of address. For example, if the mobile host 8 is located in the home network 10 as shown in FIG. 7, the domain name system server database 30 contains a resource record like "mh1 0 IN A 164.125.65.72". However, if the mobile host 8 moves to the foreign network 12 at 164.125.9.XXX, the above resource record is updated to "mh1 0 IN A 164.125.9.12" (as in the resource record area 40 of FIG. 4) after the above steps. Here, the TTL field 44 of FIG. 4 is maintained to be 0 all the time by the home agent 4.

Meanwhile, the home agent 4 carries out the care-of address updating and the conventional binding cache updating contemporaneously.

At step S120, if the correspondent node 14 sends a query about the mobile host 8 by its domain name "mh1.ce.pusan.ac.kr" to its local domain name system server, the query is delivered in the form of a domain name system query message as shown in FIG. 5 to the home agent 4 via the local domain name system server and the Internet 2 because the home agent 4 is a domain name server that solely knows the resource record of the mobile host 4.

At step S130, the home agent 4 sends a domain name system response message, which includes the current care-of address of the mobile host 8, "164.125.9.12" in the resource data field 70 and TTL=0 in the TTL field 66 as shown in FIG. 6 based on the domain name system server database 30, to the correspondent node 14 via the Internet 2.

At step S140, the correspondent node 14 communicates directly with the mobile host 8 at the current care-of address with no triangle routing required. If the correspondent node 14 queries the home agent 4 again about the mobile host 8 by domain name, the domain name system query message is delivered to the home agent 4 because either the correspondent node 14 or the local domain name system server did not record the previous care-of address of the mobile host 8 in view of TTL=0 in the previous domain name system response message.

Performance for the present invention was evaluated using the Network Simulator-2 (NS-2) simulation tool. The simulation revealed that the inventive route optimization exhibits higher performance than the mobile Internet Protocol shown in FIGS. 1 and 2, and revealed that the inventive route optimization is efficient especially when time delay between a foreign agent and a home agent becomes longer.

The foreign agent 6 can correspond to a desktop computer, the home agent 4 can correspond to a desktop computer, and the correspondent node 14 can correspond to a desktop computer, for example. The mobile host 8 can be a personal digital assistant, a wearable computer, a notebook computer, a laptop computer, a desktop computer, a telephone, an e-book used for reading books in electronic form, or another Internet apparatus, for example.

The IP address 164.125.65.72 in FIG. 3 can be considered to be a first address and corresponds to an identifier of said mobile host 8 when said mobile host 8 is in the home network 10. The care-of address 164.125.9.12 in FIG. 3 can be considered to be a care-of address and corresponds to an identifier of said mobile host 8 when said mobile host 8 is in the foreign network 12. The first address and the care-of address are each associated with the domain name mh1.ce.pusan.ac.kr.

The present invention is applicable to domain name service for any Internet devices that can access the Internet through a home agent (either wirelessly or not wirelessly) and access the Internet through a foreign agent (either wirelessly or not wirelessly). The aforementioned Internet devices can access the Internet and include personal digital assistants, wearable computers, notebook computers and laptop computers other portable computers, desktop computers, some wireless telephones, e-books, and other Internet apparatuses or World Wide Web apparatuses. The aforementioned Internet devices can be considered to be mobile terminals or mobile hosts. The aforementioned Internet devices can access the Internet through a home agent, can be moved to a new location, and then can access the Internet through a foreign agent at the new location. The wireless communication between the mobile host 8 and the foreign agent 6, as shown in FIG. 7, could be light communication or radio communication, for example.

As described above, the present invention advantageously increases mobile Internet Protocol performance by eliminating triangle routing using the domain name system (DNS) server function of a home agent, enables a domain name to be used for a mobile host that has a dynamically changed Internet Protocol address as it roams in an integrated wired/wireless network, and is applicable to domain name service for mobile terminals, such as personal digital assistants (PDAs), in a mobile IP service-providing environment such as code division multiple access (CDMA) 2000.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A route optimization method in a mobile Internet Protocol system using a mobile Internet Protocol, the method comprising:
   sending a registration request message containing a care-of address to a home agent through a foreign agent when a mobile host is assigned to the care-of address corresponding to a changed point of access to the Internet, the home agent being a part of a home network for the mobile host to access the Internet, the foreign agent being a part of a foreign network for the mobile host to access the Internet, the home agent being distinguishable from the foreign agent;
   storing the care-of address in an internal domain name server database by the home agent, the care-of address being stored to correspond to domain name of the mobile host;
   when a query by domain name about the mobile host is received from a correspondent node, sending the care-of address corresponding to the domain name of the mobile host together with caching prevention information to the correspondent node from the home agent, the caching prevention information being set to prevent the correspondent node from caching the care-of address of the mobile host, the caching prevention information being set to prevent any domain name server from caching the care-of address of the mobile host; and
   communicating with the mobile host by the correspondent node using the care-of address corresponding to the domain name of the mobile host.

2. The method of claim 1, the caching prevention information being time-to-live set to 0.

3. The method of claim 1, further comprising accessing the Internet through the home agent by the mobile host and then accessing the Internet through the foreign agent by the mobile host, before said sending of the registration request message.

4. The method of claim 3, further comprising connecting the foreign agent, the home agent, and the correspondent node together through the Internet.

5. The method of claim 4, the foreign agent, the home agent, the mobile host, and the correspondent node each being a respective computer.

6. The method of claim 4, the mobile host being one selected from among a personal digital assistant, a wearable computer, a notebook computer, and a telephone.

7. The method of claim 6, further comprising:
   before said storing of the care-of address in the database, storing the domain name of the mobile host in the database to correspond with a first address associated with the mobile host accessing the Internet through the home agent;
   the care-of address being an address associated with the mobile host accessing the Internet through the foreign agent, the care-of address being distinguishable from the first address.

8. A communication optimization method for communicating through the Internet, the method comprising:
   providing a domain name to a mobile host;
   storing in a database a care-of address to correspond to the domain name of the mobile host, said storing being performed by a home agent when the care-of address of the mobile host is received, the care-of address corresponding to a new point of attachment when the mobile host attaches to the Internet from the new point of attachment;
   sending the care-of address corresponding to the domain name of the mobile host together with caching prevention information to a correspondent node by the home agent in response to a query about the mobile host by domain name from the correspondent node, the caching prevention information being set to prevent the correspondent node from caching the care-of address of the mobile host, the caching prevention information being set to prevent any domain name server from caching the care-of address of the mobile host; and
   communicating with the mobile host by the correspondent node using the care-of address corresponding to the domain name of the mobile host.

9. The method of claim 8, further comprising connecting the foreign agent, the home agent, and the correspondent node together through the Internet.

10. The method of claim 8, the caching prevention information being time-to-live set to 0.

11. The method of claim 8, the mobile host being one selected from among a personal digital assistant, a wearable computer, a notebook computer, and a telephone.

12. A mobile Internet Protocol system, comprising:
   an Internet;
   a mobile host having a domain name and establishing a link with the Internet;
   a home agent in a home network, said mobile host attaching to the Internet through said home agent when said mobile host is in the home network; and
   a foreign agent in a foreign network, said mobile host attaching to the Internet through said foreign agent when said mobile host is moved from the home network to the foreign network;
   said home agent storing in a domain name server database a care-of address of said mobile host to correspond to the domain name when said mobile host is attached to the Internet through said foreign agent, said home agent storing the care-of address in response to a registration request message sent to said home agent when said mobile host is moved to the foreign network, the registration request message containing the care-of address;
   said home agent sending to a correspondent node the care-of address and caching prevention information in response to a query from the correspondent node about said mobile host, the query being by domain name, the caching prevention information being set to prevent the correspondent node from caching the care-of address of the mobile host, the caching prevention information being set to prevent any domain name server from caching the care-of address of said mobile host.

13. The system of claim 12, the link established by said mobile host with the Internet being a wireless link.

14. The system of claim 13, said mobile host being positioned in the home network and attaching to the Internet through said home agent and said home agent storing a first address to correspond to the domain name before the care-of address is stored to correspond to the domain name, said mobile host being positioned in the foreign network and attaching to the Internet through said foreign agent and said foreign agent sending the registration request message to said home agent after the first address is stored and before the care-of address is stored, the first address corresponding to an identifier of said mobile host when said mobile host is in the home network, the care-of address corresponding to an identifier of said mobile host when said mobile host is in the foreign network, the first address and the care-of address each being associated with the domain name.

15. The system of claim 14, the wireless link being one selected from among a light communication link and a radio communication link.

16. The system of claim 12, said mobile host being positioned in the home network and attaching to the Internet through said home agent and said home agent storing a first address to correspond to the domain name before the care-of address is stored to correspond to the domain name, said mobile host being positioned in the foreign network and attaching to the Internet through said foreign agent and said foreign agent sending the registration request message to said home agent after the first address is stored and before the care-of address is stored, the first address corresponding to an identifier of said mobile host when said mobile host is in the home network, the care-of address corresponding to an identifier of said mobile host when said mobile host is in the foreign network, the first address and the care-of address each being associated with the domain name.

17. The system of claim 16, said home agent and said foreign agent and the correspondent node each corresponding to a respective computer, said mobile host being one selected from among a personal digital assistant, a wearable computer, a notebook computer, and a telephone.

18. The system of claim 17, the caching prevention information being time-to-live set to 0.

19. The system of claim 18, the link established by said mobile host with the Internet being a wireless link.

* * * * *